(12) United States Patent
Ringler et al.

(10) Patent No.: US 10,752,219 B2
(45) Date of Patent: Aug. 25, 2020

(54) CLEANING DEVICE FOR CLEANING A TRANSPARENT CAMERA COVER

(71) Applicants: Conti Temic microelectronic GmbH, Nuremberg (DE); CONTINENTAL AUTOMOTIVE GMBH, Hannover (DE)

(72) Inventors: Dirk Ringler, Friedewald-Motzfeld (DE); Torsten Hahn, Homberg (DE); Stefan Schäckel, Bad Hersfeld (DE); Thomas Werner, Nentershausen (DE); Johannes Frölich, Setzingen (DE); David Lässle, Langenau (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 260 days.

(21) Appl. No.: 15/918,274

(22) Filed: Mar. 12, 2018

(65) Prior Publication Data

US 2018/0201232 A1   Jul. 19, 2018

Related U.S. Application Data

(63) Continuation of application No. PCT/DE2016/200407, filed on Aug. 30, 2016.

(30) Foreign Application Priority Data

Sep. 14, 2015   (DE) ..................... 10 2015 217 546.4

(51) Int. Cl.
*B08B 3/02* (2006.01)
*B60S 1/56* (2006.01)
*B60S 1/52* (2006.01)
*G02B 27/00* (2006.01)

(52) U.S. Cl.
CPC .................... *B60S 1/56* (2013.01); *B08B 3/02* (2013.01); *B60S 1/52* (2013.01); *G02B 27/0006* (2013.01)

(58) Field of Classification Search
CPC ..... B60S 1/56; B60S 1/52; B08B 3/02; G02B 27/0006
USPC ....................................................... 134/98.1
See application file for complete search history.

(56) References Cited

U.S. PATENT DOCUMENTS

| 6,296,198 B1 * | 10/2001 | Tores | B60S 1/481 239/284.1 |
|---|---|---|---|
| 2015/0040953 A1 | 2/2015 | Kikuta et al. | |
| 2016/0101735 A1 | 4/2016 | Trebouet | |

FOREIGN PATENT DOCUMENTS

| CN | 201923085 U | 8/2011 |
|---|---|---|
| DE | 1497581 A | 4/1969 |
| DE | 10302748 A1 | 8/2004 |
| DE | 102005045410 A1 | 3/2007 |
| DE | 102010007850 A1 | 9/2010 |
| DE | 102012218583 A1 | 4/2013 |
| DE | 102014202072 A1 | 7/2015 |

(Continued)

OTHER PUBLICATIONS

DE102014202072A1—Machine translation (Year: 2015).*

(Continued)

*Primary Examiner* — Tinsae B Ayalew

(57) ABSTRACT

Cleaning device for cleaning a transparent cover of a camera, in particular a lens of the camera, comprising at least one cleaning agent feed line and at least two cleaning agent spraying elements.

9 Claims, 6 Drawing Sheets

(56) References Cited

FOREIGN PATENT DOCUMENTS

DE 202015102640 U1 8/2015

OTHER PUBLICATIONS

International Search Report and Written Opinion dated Dec. 19, 2016 from corresponding International Patent Application No. PCT/DE2016/200407.
German Office Action dated Jun. 22, 2016 for corresponding German Patent Application No. 10 2015 217 546.4.
Japanese Notice of Reasons for Refusal dated Dec. 20, 2019 for the counterpart Japanese Patent Application No. 2018-513469.

* cited by examiner

CLEANING DEVICE FOR CLEANING A TRANSPARENT CAMERA COVER

CROSS REFERENCE TO RELATED APPLICATION

This application is a continuation of International application No. PCT/DE2016/200407, filed Aug. 30, 2016, which claims the priority to German patent application No. 10 2015 217 546.4, filed Sep. 14, 2015, each of which is hereby incorporated by reference.

TECHNICAL FIELD

The technical field relates generally to a cleaning device for cleaning a transparent cover of a camera.

BACKGROUND

Nowadays, assistance systems having appropriate sensors, which support the vehicle user while driving the vehicle, are increasingly being integrated into motor vehicles. For example, camera-based systems for optically monitoring the vehicle surroundings are known as assistance systems. Such assistance systems typically comprise at least one camera arranged on the vehicle exterior for optically detecting and recording the vehicle surroundings. The installation position of the cameras on the vehicle is, in this case, governed in particular by the determining assistance function. For example, cameras for reversing aids are typically arranged in the region of the rear of the vehicle or in the region of the vehicle rear window. So-called surround view camera systems typically include, in addition to a front and a rearview camera, two further cameras which are mostly arranged below the left or respectively right exterior mirror. The images acquired by the cameras can typically be shown to the vehicle user on a display in the vehicle cab.

Since the cameras are, as a general rule, arranged on the vehicle exterior and at positions where they are poorly protected from dirt and external weather conditions, various cleaning systems are already known from the prior art, with which the cameras, in particular the optical elements thereof such as lenses or cover glasses, can be cleaned if required, in order to be able to guarantee as continuously as possible a clear view of the surrounding area which is to be detected.

In this context, there is known from the published patent application DE 103 02748 A1 a device for cleaning a visual observation device on a vehicle, in particular a camera lens, in which at least one spray jet through which the visual observation device is charged as required with a flowing medium, wherein both washing fluid and compressed air can flow through the spray jet.

The published patent application DE 10 2012 218 583 A1 also discloses a device for cleaning a camera, wherein in this case a mixture of wash water and high-pressure air is used, which mixture is routed via a high-pressure air passage towards the camera lens and is sprayed via a spray nozzle located there onto the lens.

However, one disadvantage of the known cleaning systems is the fact that these either include only one spray nozzle, resulting in a low efficiency as regards the distribution of the cleaning agent used in each case, or comprise multiple spray nozzles, as a result of which each spray nozzle has to be provided with its own supply line and conveying equipment for the cleaning agent. A further disadvantage is the fact that the spray nozzles are, as a general rule, located adjacent to or above the objective of the camera, which leads to a restriction in the field of view of the camera in this area.

As such, it is desirable to present an improved cleaning device for cleaning a transparent camera cover, which overcomes the disadvantages indicated. In addition, other desirable features and characteristics will become apparent from the subsequent summary and detailed description, and the appended claims, taken in conjunction with the accompanying drawings and this background.

SUMMARY

According to one exemplary embodiment, the cleaning device is used for cleaning a transparent cover of a camera. The transparent cover may, for example, be a lens of an objective of the camera or, for example, a cover glass, behind which the camera is arranged. The camera may, for example, be a camera which is part of a driver assistance system of a vehicle and which is arranged on the exterior of the vehicle and is therefore exposed to different weather conditions and a high pollution potential.

The cleaning device according to one exemplary embodiment includes at least one cleaning agent feed line, for example a hose or a tubular channel, on which a conveying system for the cleaning agent used in each case may be arranged. For example, liquid and/or gaseous cleaning agents are suitable as cleaning agents.

Furthermore, the cleaning device according to one exemplary embodiment includes at least two cleaning agent spraying elements which are arranged in a cleaning agent spraying portion which may join the cleaning agent feed line directly or respectively is connected thereto. The cleaning agent spraying elements are used to distribute the cleaning agent used in each case on the cover to be cleaned, i.e., towards or respectively targeted at the transparent cover to be cleaned. To this end, cleaning nozzles or deflectors are, for example, suitable as cleaning agent spraying elements.

According to one exemplary embodiment, the cleaning device includes at least one annular channel in the region of the cleaning agent spraying portion. The annular channel is, in this case, connected directly to the cleaning agent feed line or respectively joins this directly. Furthermore, the at least two cleaning agent spraying elements may be arranged directly on the annular channel. The annular channel is preferably configured concentrically and in such a manner that the cover of the camera which is to be cleaned can be arranged inside the annular channel, and that the latter surrounds the cover to be cleaned in the form of a ring. The annular channel is used, in this case, to distribute the cleaning agent conveyed under pressure out of the cleaning agent feed line into the annular channel to the cleaning agent spraying elements.

According to one exemplary configuration of the cleaning device, the cleaning agent spraying elements are configured above the annular channel.

According to another exemplary configuration of the cleaning device, the cleaning agent spraying elements are deflectors which are arranged on bores in the annular channel, which represent the outlet openings for the cleaning agent used in each case.

According to another exemplary configuration of the cleaning device, the cleaning agent spraying elements are configured inside the annular channel, i.e., arranged in the inner ring of the annular channel directed towards the circle center of the annular channel.

According to another exemplary configuration of the cleaning device, the cleaning agent spraying elements are spray nozzles which are configured inside the annular channel or are arranged, for example, on bores inside the annular channel.

According to another exemplary configuration of the cleaning device, the annular channel is configured in two parts, in particular having an annular channel lid on which the cleaning spraying elements are arranged or respectively configured.

One material advantage is that, thanks to the use of the annular channel, each cleaning agent spraying element does not require its own supply lines.

A compact and effective cleaning devices therefore presented. The cleaning effect is in the process determined by a system of multiple influencing factors. These factors include the number of deflectors, the water pressure, the quantity of water, the spray time, and the number of repetitions. The individual parameters of this system can be individually adjusted to the camera and the application. Consequently, both the cleaning effect and the required quantity of water can be optimized.

The number and position of the deflectors are variable, in particular in the case of a two-part configuration of the annular channel having an annular channel lid on which the cleaning agent spraying elements are arranged or respectively configured. The cameras require various free fields of vision without blind spots in different installation situations. This can be shown by the displacement of the deflectors on the annular channel. Consequently, a rotationally symmetrical arrangement is possible in the case of an installation on the side mirror of a vehicle, which would restrict the field of view in the case of an installation on the tailgate. The annular channel may be moved downwards in the axis of the lens due to an increase in the deflectors, with which the visual impairment of the vehicle design is reduced to a minimum. In addition, this disclosure provides a compact unit which allows installation in confined regions such as external mirrors or handles on the tailgate.

Furthermore, the disclosure relates to an optical detection device for arrangement in a vehicle, comprising a camera, which is configured with a cleaning device according to any one of the previously described configurations, as well as a vehicle in which a corresponding optical detection device or the cleaning device according to the invention is arranged.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
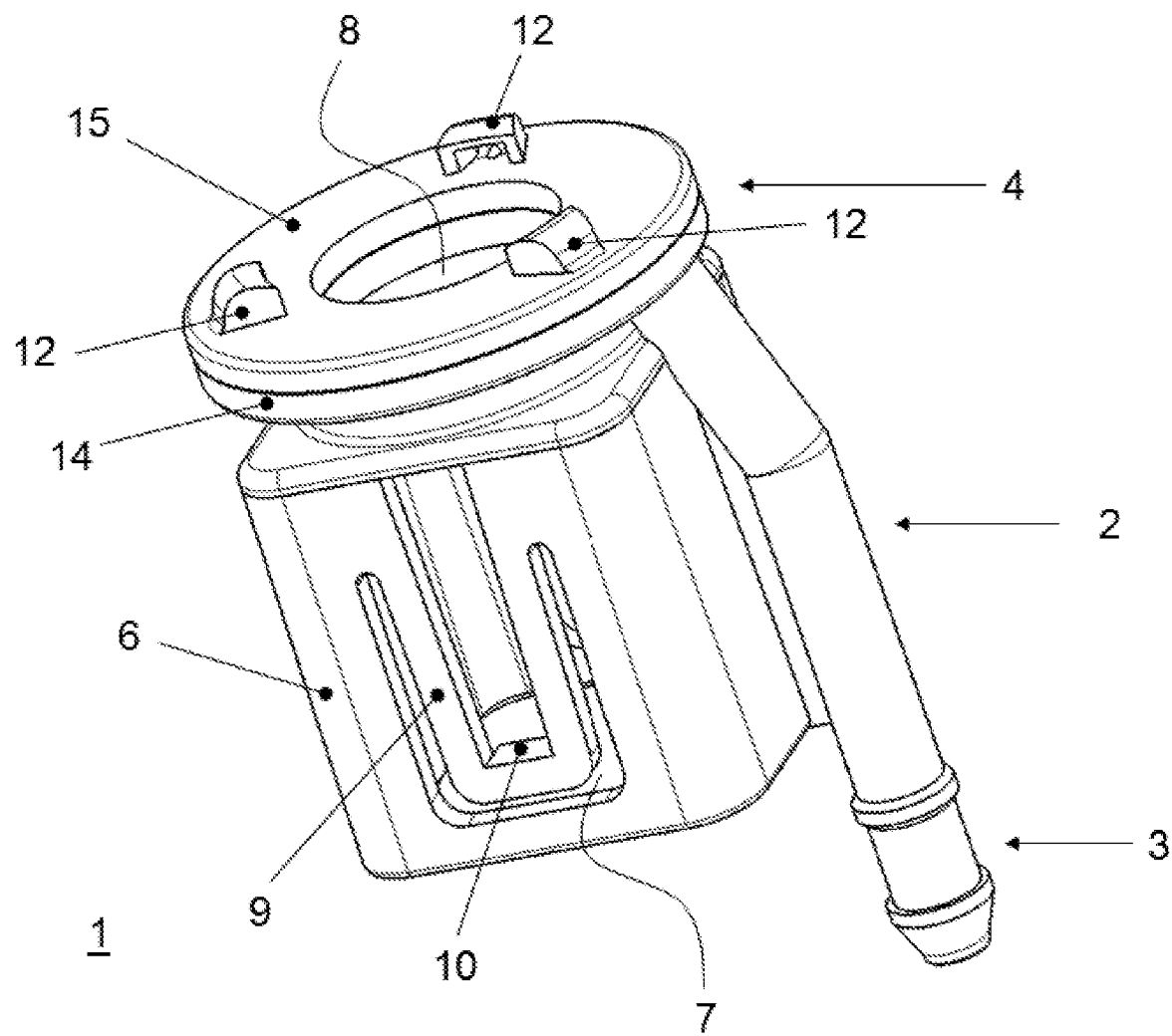
FIG. 1 shows a first embodiment example of a cleaning device.
Figure 2:
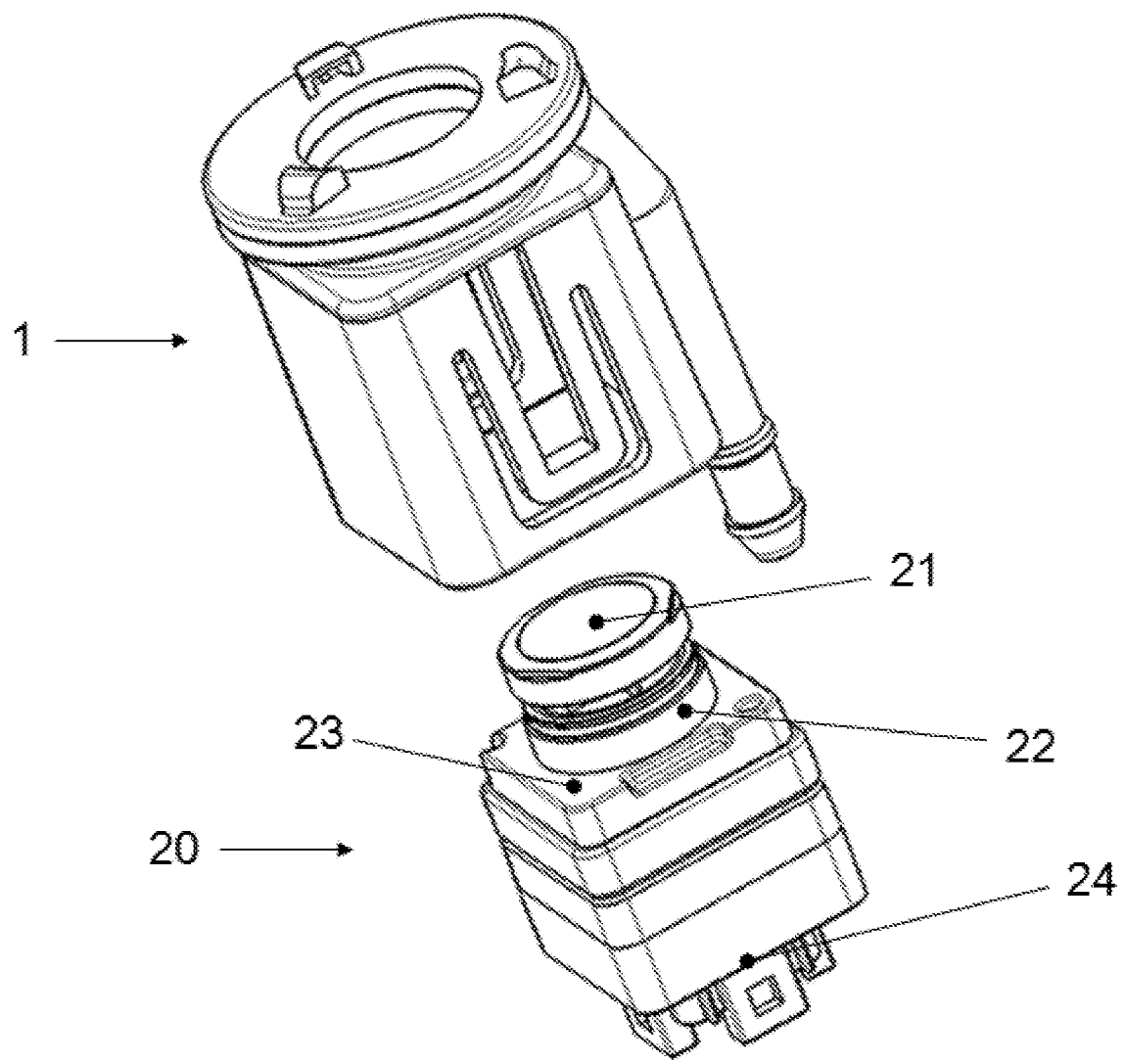
FIG. 2 shows the cleaning device from FIG. 1 together with a camera which may be arranged in the cleaning device.

A first embodiment example of the cleaning device 1 for cleaning a transparent cover 21 of a camera 20 for a vehicle is shown in FIGS. 1 to 5. The optically transparent cover 21 in the embodiment example shown is, in this case, a lens of the camera 20.

The cleaning device 1 has a cleaning agent feed line 2, through which various cleaning agents, for example a cleaning fluid, compressed air or a mixture of cleaning fluid and compressed air can be conveyed towards a cleaning agent spraying portion 4, in which the transparent cover 21 to be cleaned is preferably located.

The cleaning agent feed line 2 is, in the embodiment example shown, designed as a tubular channel, at one end of which, in particular at the inlet of which, a connection nozzle 3 is configured. For example, a pump can thus be joined as conveying equipment to the connection nozzle 3, in particular via a hose, said pump pumping the respective cleaning agent through the cleaning agent feed line 2 towards the cleaning agent spraying portion 4, on being activated.

The cleaning device 1 shown includes a receptacle 6, on which the cleaning agent feed line 2 having a connection nozzle 3 and the cleaning agent spraying portion 4 are arranged or respectively configured. The receptacle 6 is, in this case, configured in the form of a housing which includes an inner chamber which serves as a sleeve-like receptacle 6 for the camera 20. To this end, the receptacle 6 is configured in such a manner that the camera 20 may be substantially positively introduced into the interior of the receptacle 6 and positioned therein. To this end, the dimensions of the inner chamber of the receptacle 6 and the outer dimensions of the housing of the camera 20 can be dovetailed accordingly, taking account of tolerances.

An insertion opening 7, through which the camera 20 is introduced into the receptacle 6 of the cleaning device 1, is located in the embodiment example shown on the side of the cleaning device 1 opposite the spray portion 4. The camera 20 may be inserted with its objective 22 first into the receptacle 6 and positioned in such a manner that the outer lens of the objective 22 and therefore the transparent cover 21 to be cleaned are located in the cleaning agent spraying portion 4. In the embodiment example shown, the cleaning agent spraying portion 4 includes, to this end, an opening 8 to the inside of the receptacle 6, which is opposite the insertion opening 7. The size and shape of the opening 8 may, in this case, be adapted to the size and shape of the transparent cover 21 of the camera 20, which is to be cleaned, in this case to the size of the objective 22 of the camera 20.

Figure 4:
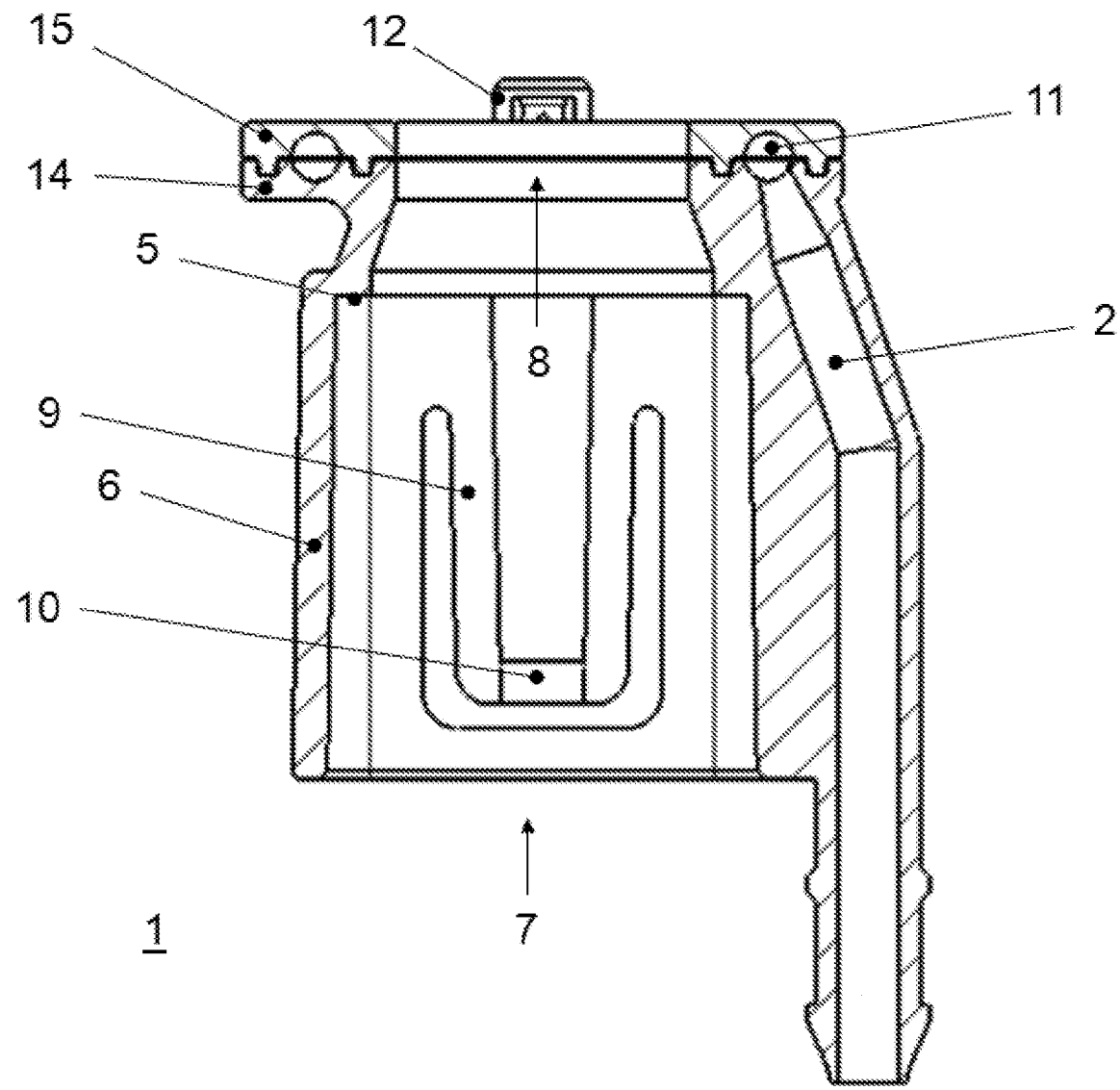
FIG. 4 shows the cleaning device from FIG. 1 as a cross-sectional view.

The receptacle 6 is, as shown in greater detail in FIG. 4, positioned in the interior in the region of the cleaning agent spraying portion 4, i.e., on the side opposite the insertion opening 7, and configured with a stop 5, against which the camera 20, in particular the housing or respectively an edge 23 of the housing of the camera 20, is positioned on introduction into the receptacle 6. The stop 5 is, in this case, arranged in such a manner that a defined positioning of the transparent cover 21 to be cleaned in the cleaning agent spraying portion 4 or respectively in the opening 8 of the cleaning agent spraying portion 4 is achieved by the stop 5.

In the embodiment example shown, fasteners are disposed on the receptacle 6 of the cleaning device 1. By utilization of these fasteners, the camera 20 may be detached from the receptacle 6. According to the figures, the fasteners is a latching mechanism. To this end, a U-shaped bending lug 9 having a detent 10 is disposed on the housing of the cleaning device 1. This springy bending lug 9 is bent outwardly from the housing of the camera 20, on introducing the camera 20 into the receptacle 6, until such time as the detent 10 engages in a catch provided therefor, in this case an edge 24 on the housing of the camera 20. This may take place at the moment that the camera 20 is positioned in the front region of the receptacle 6 against the stop 5. In this case, the latching mechanism can, in particular, be configured in such a manner that the camera positioning is held against the stop 5 under tension by the latching mechanism.

The cleaning agent spraying portion 4 of the cleaning device 1 includes annular channel 11. In the exemplary embodiment, the annular channel 11 is configured concentrically and is connected directly to the cleaning agent feed line 2 so that the respective cleaning agent is conducted directly by the cleaning agent feed line 2 into the annular channel 11 and is distributed there. In this case, the annular channel 11 surrounds the opening 8 of the cleaning agent spraying portion 4.

Furthermore, multiple cleaning agent spraying elements are arranged on the annular channel 11. In the case of the embodiment example shown in FIGS. 1 to 5, the cleaning agent spraying elements are three deflectors 12. The deflectors 12 are, in this case, arranged above bores 13 in the otherwise closed annular channel 11, i.e., except for the bores 13 and the connection to the cleaning agent feed line 2. The deflectors 12 serve to deflect the cleaning agent which exits under pressure via the bores 13 from the annular channel 11 towards the opening 8 of the cleaning agent spraying portion 4, in particular towards the circle center of the annular channel 11.

The position and the number of the deflectors 12 on the annular channel 11 may be adapted to the respective installation situation of the camera 20 and the cleaning device 1 on the vehicle. Furthermore, the number and the position may also be made conditional as a function of the field of view to be detected by the camera 20. For example, so-called "fish eye lenses" are used in so-called surround view camera systems, which fish eye lenses lend the camera 20 a field of view or respectively a detection angle of more than 180°. In particular, in the case of such camera systems, the deflectors 12 may consequently be located in the field of view of the camera 20 and, as a result, restrict the image acquisition in these regions. Thanks to an adapted or respectively flexible distribution of the deflectors 12, it is possible to move this field of view restriction to regions of the field of view which are less relevant.

Figure 3:
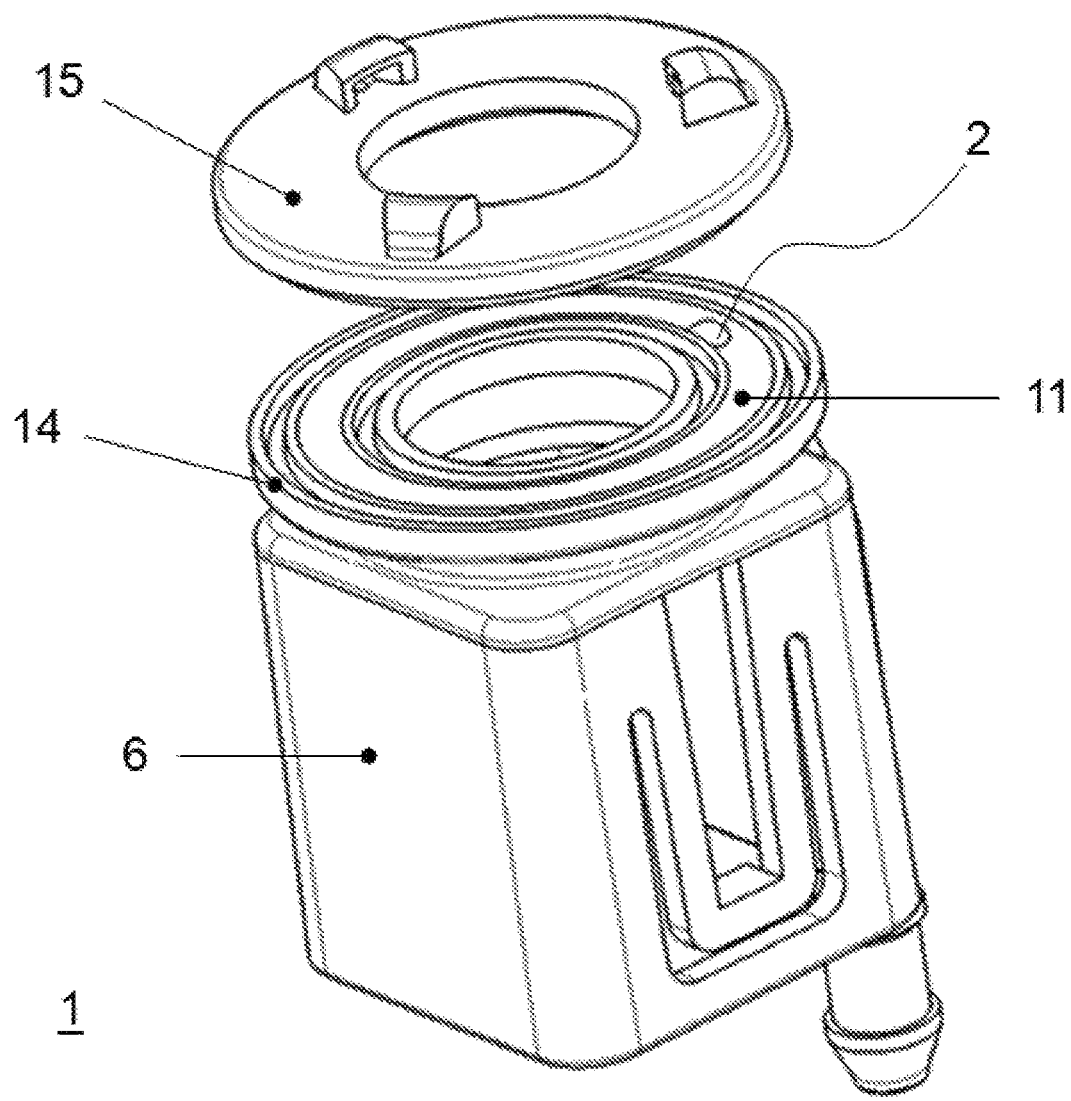
FIG. 3 shows the cleaning device from FIG. 1 as an exploded view.
Figure 5:
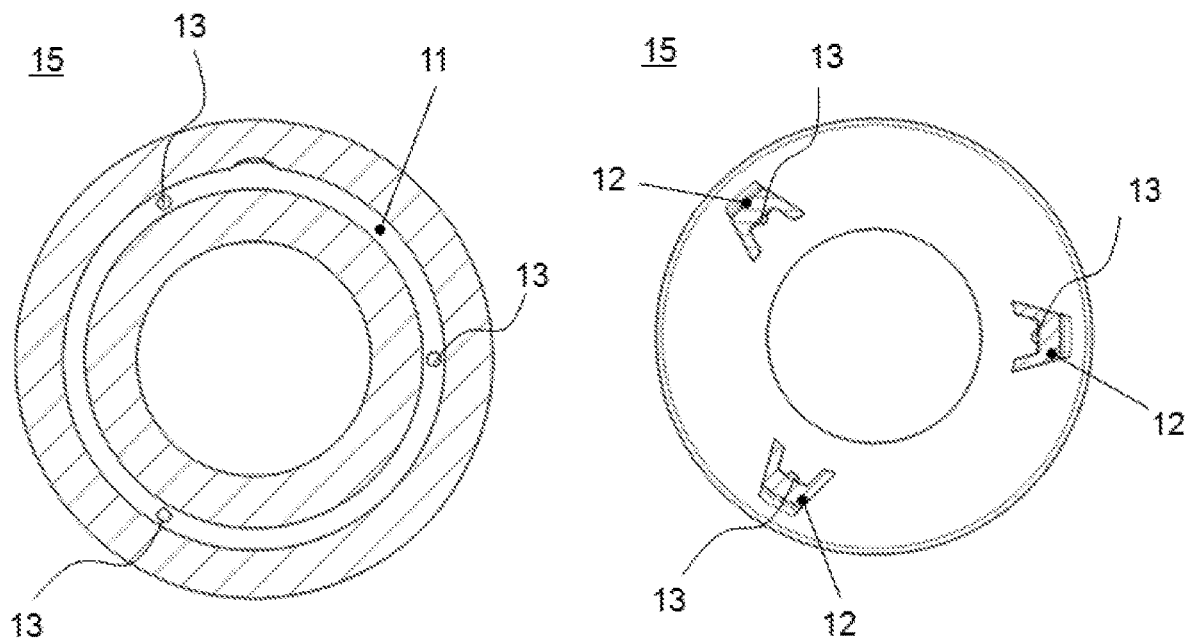
FIG. 5 shows the annular channel lid of the cleaning device from FIG. 1 from two different perspectives.

It is particularly advantageous for a flexible or respectively adapted distribution of the deflectors 12, if the annular channel 11, as shown in greater detail in FIGS. 3, 4 and 5, is configured as at least a two-part housing body. In the example shown, the annular channel 11 is, in this case, formed from a lower half 14 which is directly configured on the receptacle 6 of the cleaning device 1 and to which the cleaning agent feed line 2 is directly linked, and from an upper half which is configured as an annular channel lid 15. The annular channel lid 15 includes, in this case, the deflectors 12 which are arranged above bores 13 in the annular channel 11 and can, depending on the type of material, be welded, snap-fitted, or glued, for example, to the lower half 14 of the annular channel 11. In this way, in particular by means of the described configuration of the annular channel 11 having a separate annular channel lid 15, the position and the number of deflectors 12 can be simply changed, and therefore the entire cleaning device 1 can be very easily adapted to different requirements, namely preferably by exchanging or respectively by using an annular channel lid 15 adapted to the respective requirements, with the cleaning device 1 otherwise unchanged.

Figure 6:
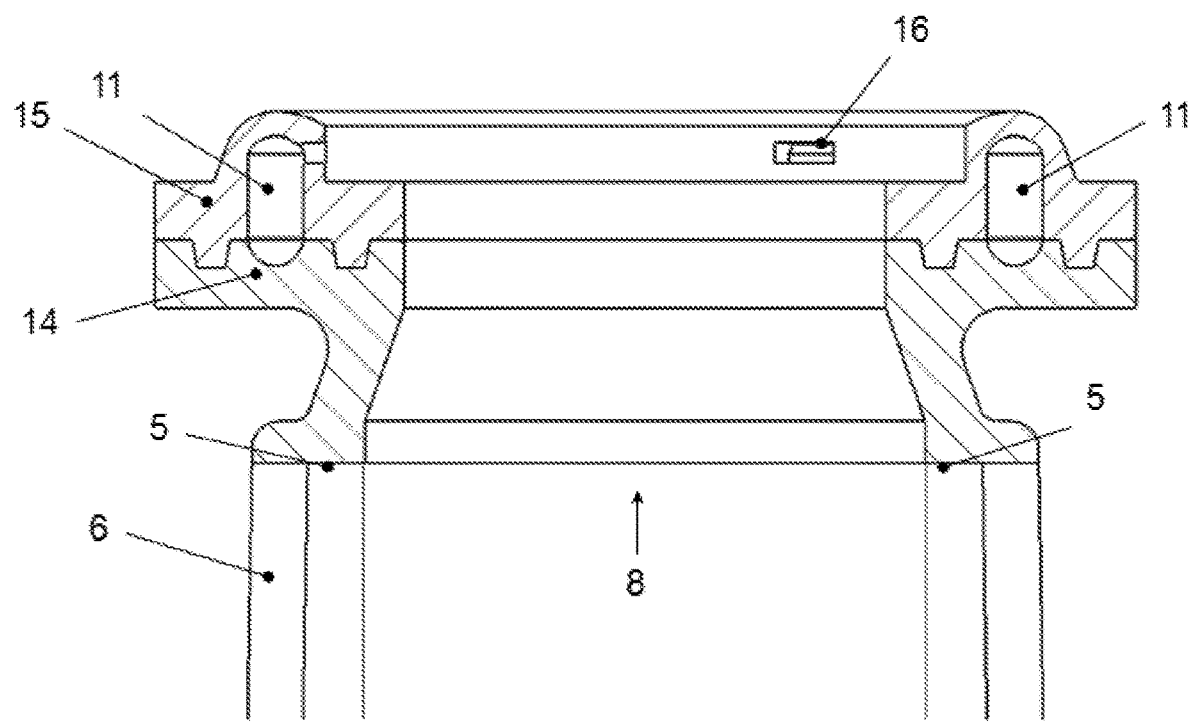
FIG. 6 is a cross-sectional view of an alternative configuration of the cleaning device, in particular a detailed representation of a raised annular channel with internal spray openings.

According to another configuration of the cleaning device 1, instead of the deflectors 12 arranged above the annular channel 11, the cleaning agent spraying elements may, in particular, also be arranged towards the center of the annular channel 11. This configuration is shown, by way of example, in FIG. 6. The cleaning agent spraying elements, in this case, are spray openings 16 in the annular channel 11, which are configured in such a manner that these function as spray nozzles for the cleaning agent located under pressure in the annular channel 11 and conduct said cleaning agent towards the center of the annular channel 11, i.e., towards the position of the transparent cover 21 to be cleaned. According to FIG. 6, the annular channel 11 may, to this end, be constructively pulled upwards, i.e., can in particular be raised with respect to the configuration having deflectors 12, so that the spray openings 16 continue to be located at the level of the cover 21 to be cleaned.

The cleaning device 1 may, for example, be produced by injection molding from a metal material or from plastic. The cleaning device is, in this exemplary embodiment, produced in one piece, i.e., as a one-piece injection molded workpiece, wherein according to one advantageous configuration the annular channel may also be produced as an additional or respectively separate workpiece.

Although the present invention has been described above with reference to embodiment examples, it is not limited to these, but can be modified in a variety of ways. In particular, the invention can be altered or modified in various ways, without deviating from the basic invention.

In addition, it is pointed out that "comprising" and "having" does not exclude any other elements or steps and "a" does not exclude a plurality. It is additionally pointed out that features which have been described with reference to one of the above embodiment examples, can also be used in combination with other features or steps of other embodiment examples described above.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A cleaning device for cleaning a transparent cover of a camera, the cleaning device comprising:
   at least one cleaning agent feed line;
   at least two cleaning agent spraying elements;
   at least two bores, wherein each one of the at least two cleaning agent spraying elements is arranged on one of the at least two bores; and
   an annular channel connected to the cleaning agent feed line and on which the at least two bores are arranged connecting the annular channel to the cleaning agent spraying elements, the annular channel includes an annular channel lid on which the cleaning agent spraying elements are arranged and a lower half directly linked to the at least one cleaning agent feed line.

2. The cleaning device according to claim 1, wherein the cleaning agent spraying elements are configured above the annular channel.

3. The cleaning device according to claim 2, wherein the cleaning agent spraying elements are deflectors which are arranged on bores in the annular channel.

4. The cleaning device according to claim 1, wherein the cleaning agent spraying elements are configured inside the annular channel.

5. The cleaning device according to claim 4, wherein the cleaning agent spraying elements are spray nozzles which are configured or arranged inside the annular channel.

6. An optical detection device for arrangement in a vehicle, comprising:
 a camera which is configured with a cleaning device having:
  at least one cleaning agent feed line;
  at least two cleaning agent spraying elements;
  at least two bores, wherein each one of the at least two cleaning agent spraying element is arranged on one of the at least two bores; and
  an annular channel connected to the cleaning agent feed line and on which the at least two bores are arranged connecting the annular channel to the cleaning agent spraying elements, the annular channel includes an annular channel lid on which the cleaning agent spraying elements are arranged and a lower half directly linked to the at least one cleaning agent feed line.

7. A cleaning device for cleaning a transparent cover of a camera, the cleaning device comprising:
 a feed line defining a first fluidic channel; and
 a housing defining a receptacle configured to accommodate at least a portion of the camera;
 the housing defining an opening extending from the receptacle and configured to receive the transparent cover of the camera;
 the housing defining a second fluidic channel disposed around the opening and coupled to the first fluidic channel, the second fluidic channel includes a channel lid and a lower half directly linked to the feed line;
 the housing further comprising a plurality of spraying elements wherein each spraying element defines a spray opening and wherein each spray opening is coupled to the second fluidic channel.

8. The cleaning device according to claim 7, wherein the channel lid is removably coupled to the lower half and wherein the plurality of spraying elements are disposed on the channel lid.

9. The cleaning device according to claim 8, wherein the lower half defines a portion of the second fluidic channel and the channel lid defines a portion of the second fluidic channel.

* * * * *